J. A. HAWKESWORTH.
POWER TRANSMITTING BELT.
APPLICATION FILED JULY 27, 1921.

1,427,460.   Patented Aug. 29, 1922.

Inventor.
James A. Hawkesworth
by Heard, Smith & Pennant
Attys.

UNITED STATES PATENT OFFICE.

JAMES ALBERT HAWKESWORTH, OF LONDON, ENGLAND, ASSIGNOR TO THE GRATON & KNIGHT MANUFACTURING COMPANY, OF WORCESTER, MASSACHUSETTS.

POWER-TRANSMITTING BELT.

1,427,460.  Specification of Letters Patent.  Patented Aug. 29, 1922.

Application filed July 27, 1921. Serial No. 487,835.

*To all whom it may concern:*

Be it known that I, JAMES ALBERT HAWKESWORTH, a citizen of the United States of America, residing at 163 Herne Hill, London, England, have invented certain new and useful Improvements in Power-Transmitting Belts, of which the following is a specification.

This invention has reference to improvements in and relating to link belting, and its main object is to provide a non-stretchable power-transmitting belt of the link type, composed of non-metallic friction-producing links and metallic connecting links, in which the connection between the links is made by simply hooking them together in such a way that any link may be readily disconnected and removed or replaced by a fresh link, a further object being to reinforce the non-stretchable elements of the friction-producing links by providing them with metal rims or facings.

In driving belts of the type in question it is of the utmost importance that there should be no metal-to-metal friction, and consequently no need for lubrication; and with a view to meeting this requirement it is customary to form the metal connecting links integrally with a pivot pin at or near each end and to build up the friction-producing links of non-metallic and non-stretchable elements faced with leather or the like and spaced apart to receive between them the ends of the metal connecting links, the said non-metallic non-stretchable elements having transverse holes formed in them to receive the ends of the said pivot pins and being assembled and connected together by rivets, bolts and nuts, or screws after the pivot pins have been inserted into the said holes. The result of this is that it is impossible to open the belt or to disconnect the links without taking a link to pieces, and this defect is entirely obviated by my invention.

In a driving belt constructed in accordance with my invention the pivot pins and the metal links are separate members of the belt adapted to be engaged with each other in such a manner that they can be readily disengaged and so that there is no relative movement between them when the belt is in use. The end portions of these pivot pins are of circular cross section so that they fit rotatably in the usual sockets formed in the non-metallic, non-stretchable elements of the friction-producing links, and the central portion of each pin is rebated or flattened. The metal links are of similar shape to the ordinary metal connecting links of belts of the kind in question, but, instead of having pivot pins formed integrally with them or fixed in them, each link is formed with two oppositely inclined slots so that each end portion of the link constitutes a hook adapted to be engaged with the aforesaid rebated or flattened central portion of a pivot pin, the arrangement being such that it is impossible to unhook a link until after it is turned into a position approximately at right angles to the position it takes up when the belt is in use.

I have illustrated my invention in the accompanying drawing, in which.

Figure 1:
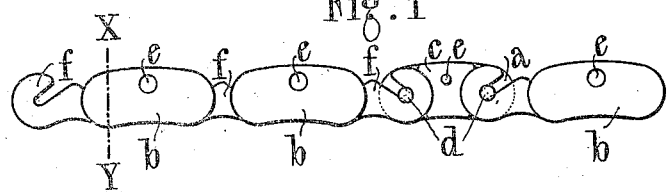
Fig. 1 is a side elevation of a portion of a belt constructed in accordance with the invention, the near side plate of one of the non-metallic friction-producing links being removed to enable the construction to be clearly understood.
Figure 2:
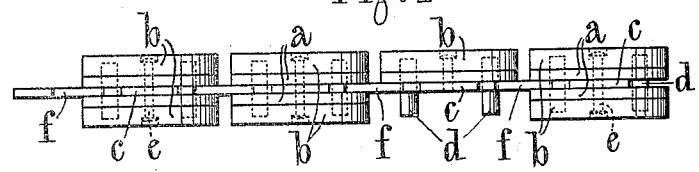
Fig. 2 is a plan view of Fig. 1.
Figure 3:
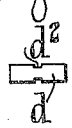
Fig. 3 shows one of the pivot pins separately.
Figure 4:
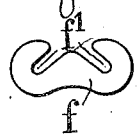
Fig. 4 shows one of the metallic links separately.
Figure 5:
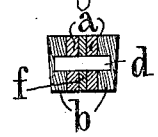
Fig. 5 is a section on line X—Y of Fig. 1.

Referring to the drawing, each friction-producing link is composed, as usual, of two non-metallic and practically non-stretchable plates $a$, preferably made of vulcanized fibre, faced with leather $b$ or other suitable friction element, the said plates being spaced apart by introducing between them plates $c$ made of the same material as the plates $a$ and shaped so that they constitute concave abutments for the circular ends of metallic connecting links to be referred to. Pivot pins $d$ are rotatably mounted in holes or sockets $d'$ formed in the non-metallic plates $a$, and the assembled members $a$, $b$ and $c$ are riveted together by means of rivets $e$.

The construction of the pivot pins $d$ and the construction of the metal connecting links $f$ constitute important features of my invention. These pivot pins are formed with end portions of circular cross section and a central portion $d^2$ which is rebated or flattened; and the metal connecting links $f$ are in the form of double hooks adapted to be engaged with the said central portions of the pins. Each link $f$ is formed with two oppositely inclined slots $f'$ in which the said central portions of the pins fit slidably but so that the pins cannot rotate relatively to the links, thus eliminating any metal-to-metal friction between the links and the pins when the belt is in use. The rounded ends of these links abut against the concave ends of the spacing members $c$ and, as will be readily understood from Fig. 1, any link $f$ may be disconnected instantly from the relative pin $d$ by turning the link into a position approximately at right angles to the normal position and pushing the link out of engagement with the pin.

Figure 6:
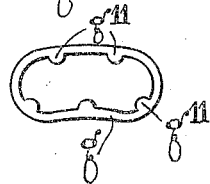
Fig. 6 shows a metal rim and Fig. 8 a metal rim and facing for reinforcing the non-metallic plates which constitute the body of the friction-producing links.
Figure 7:
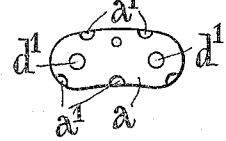
Fig. 7 shows one of the non-metallic plates with notches formed in its periphery to receive lugs formed on the reinforcing rim shown in Fig. 6.
Figure 8:
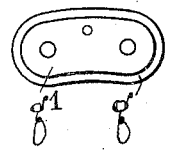

A subsidiary feature of my invention consists in providing the non-metallic plates $a$ of the friction-producing links with reinforcing rims $g$, which may be provided with a flange or lateral facing $g'$ at one side. Fig. 7 shows a plate $a$ formed with notches $a'$ in its periphery, and Fig. 6 shows a rim $g$ formed with lugs $g''$ adapted to be pressed into the said notches, while Fig. 8 shows a dished casing comprising a rim $g$ and a lateral facing $g'$. The longitudinal strain on the belt is taken by the metal connecting links and the non-metallic non-stretchable elements of the friction-producing links strengthened by metal rims or casings. The belt will therefore have practically the same strength as a chain constructed wholly of metal, while the only friction between the constituent parts of the belt in working will be between the circular ends of the pivot pins and the sockets formed to receive them in the non-stretchable elements and no lubrication of the belt will be required.

A belt constructed as described may be lengthened or shortened at any point without searching for specially constructed links. All the links will be of the same permanent construction, and the introduction of links of different lengths will enable fine adjustments of the length of the belt to be readily made.

What I claim is:

1. A power-transmitting belt of the link type composed of non-metallic friction-producing links and metal connecting links, in which the coupling means consist of pivot pins which are formed with rebated portions and are mounted rotatably in sockets formed transversely in the non-metallic friction-producing links, and hooks which are formed on the end portions of the metal connecting links and are adapted to be detachably engaged with the said rebated portions of the pivot pins.

2. In a power-transmitting belt of the link type, the combination with friction-producing links composed of pairs of non-metallic and practically non-stretchable plates spaced apart and secured together and provided on their outer faces with a friction element, of pivot pins having circular end portions engaged rotatably in sockets formed in the said plates and a rebated central portion which extends between the said plates, and a metallic connecting link interposed between each pair of the said friction-producing links and having two oppositely inclined slots formed in it so that each end portion of the link constitutes a hook adapted to be detachably engaged with the rebated central portion of one of the said pivot pins.

3. A power-transmitting belt consisting of friction-producing links composed of pairs of non-metallic plates provided with metal rims, a non-metallic spacing member interposed centrally between each pair of the said plates and secured thereto, a friction element secured upon the outer faces of the said plates, pivot pins having circular end portions engaged rotatably in sockets formed in the said plates and a rebated central portion which extends between the said plates, and metal connecting links formed at each end with a hook adapted to be engaged with the said rebated central portion of one of the said pivot pins.

JAMES ALBERT HAWKESWORTH.